(12) United States Patent
Estee et al.

(10) Patent No.: US 10,691,843 B2
(45) Date of Patent: *Jun. 23, 2020

(54) SYSTEM AND METHOD FOR CNC MACHINES AND SOFTWARE

(71) Applicant: OMC2 LLC, Berkeley, CA (US)

(72) Inventors: Michael Estee, Oakland, CA (US); Forrest Green, Austin, TX (US); Thomas Cauchois, Berkeley, CA (US); Sarah Tappon, Oakland, CA (US)

(73) Assignee: OMC2 LLC, Berkeley, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/038,016

(22) Filed: Jul. 17, 2018

(65) Prior Publication Data

US 2019/0050498 A1 Feb. 14, 2019

Related U.S. Application Data

(63) Continuation of application No. 14/489,258, filed on Sep. 17, 2014, now Pat. No. 10,055,512.

(60) Provisional application No. 61/950,642, filed on Mar. 10, 2014, provisional application No. 61/879,265, filed on Sep. 18, 2013.

(51) Int. Cl.
*G05B 19/414* (2006.01)
*G06F 30/00* (2020.01)
*G05B 19/4093* (2006.01)
*G06F 119/18* (2020.01)

(52) U.S. Cl.
CPC ....... *G06F 30/00* (2020.01); *G05B 19/40937* (2013.01); *G05B 19/414* (2013.01); *G05B 2219/33099* (2013.01); *G05B 2219/36268* (2013.01); *G05B 2219/36284* (2013.01); *G06F 2119/18* (2020.01); *Y02P 90/265* (2015.11)

(58) Field of Classification Search
CPC ............ G05B 19/40937; G05B 19/414; G05B 2219/33099; G05B 2219/36268; G05B 2219/36284; G06F 17/50; G06F 2217/12; Y02P 90/265

See application file for complete search history.

(56) References Cited

U.S. PATENT DOCUMENTS

| 4,841,822 | A | 6/1989 | Gerber |
| 5,216,614 | A | 6/1993 | Kuchta et al. |
| 5,492,313 | A | 2/1996 | Pan et al. |
| 6,050,556 | A | 4/2000 | Masuda et al. |
| 6,129,527 | A | 10/2000 | Donahoe et al. |
| 6,192,777 | B1 | 2/2001 | Williams et al. |
| 6,559,882 | B1 * | 5/2003 | Kerchner ............ H05B 6/6435 |
| | | | 219/506 |
| 7,949,501 | B1 * | 5/2011 | Iravani ............ G05B 19/41885 |
| | | | 703/6 |

(Continued)

OTHER PUBLICATIONS

"CNC Machine Simulation," Orplis, Mar. 24, 2009 [retrieved Nov. 14, 2017], https://www.youtube.com/watch?v=pJn-iSAcyro, 3 pages.

(Continued)

*Primary Examiner* — Michael J Huntley
(74) *Attorney, Agent, or Firm* — Davis Wright Tremaine LLP

(57) ABSTRACT

A method of rendering a machine state, a method of generating and rendering a work-piece cut path, and a CNC machines system are disclosed.

18 Claims, 14 Drawing Sheets

(56) References Cited

U.S. PATENT DOCUMENTS

| | | | | |
|---|---|---|---|---|
| 8,175,861 | B2* | 5/2012 | Huang | G05B 19/4068 700/159 |
| 8,345,066 | B2* | 1/2013 | Moritz | G06F 3/011 345/633 |
| 9,448,553 | B2* | 9/2016 | De Schepper | G05B 19/4097 |
| 9,524,583 | B2* | 12/2016 | Montana | G06T 19/00 |
| 9,643,314 | B2* | 5/2017 | Guerin | B25J 9/1605 |
| 10,067,495 | B2* | 9/2018 | Rivers | G05B 19/19 |
| 2002/0029134 | A1* | 3/2002 | Friedrich | G05B 19/41885 703/1 |
| 2002/0133264 | A1* | 9/2002 | Maiteh | G05B 19/4097 700/182 |
| 2005/0107897 | A1* | 5/2005 | Callaghan | G05B 19/4185 700/87 |
| 2005/0155043 | A1* | 7/2005 | Schulz | G05B 15/02 719/328 |
| 2009/0000437 | A1 | 1/2009 | Johnson et al. | |
| 2009/0000444 | A1 | 1/2009 | Johnson et al. | |
| 2009/0199690 | A1 | 8/2009 | Sun et al. | |
| 2010/0063616 | A1* | 3/2010 | Mori | G05B 19/406 700/160 |
| 2010/0274380 | A1* | 10/2010 | Gray | G05B 19/4097 700/104 |
| 2011/0280999 | A1 | 11/2011 | Crystal et al. | |
| 2011/0283849 | A1 | 11/2011 | Takizawa | |
| 2012/0050256 | A1* | 3/2012 | Thiel | G06T 19/003 345/419 |
| 2012/0221140 | A1* | 8/2012 | Berman | G05B 19/4093 700/187 |
| 2012/0247292 | A1 | 10/2012 | Kawaguchi et al. | |
| 2012/0247929 | A1 | 10/2012 | Heber et al. | |
| 2012/0290122 | A1* | 11/2012 | Morfino | G05B 19/4069 700/184 |
| 2012/0296463 | A1* | 11/2012 | Rivers | B23Q 9/0042 700/114 |
| 2013/0131840 | A1* | 5/2013 | Govindaraj | G05B 19/41865 700/19 |
| 2014/0088746 | A1* | 3/2014 | Maloney | B25J 9/1684 700/97 |

OTHER PUBLICATIONS

"CNC Vibrating Knife Corrugated Cutting Table," TTNET.NET Co., Ltd., copyright 2013 [retreived Jul. 12, 2013], www.ttnet.net/ttnet/gotoprd/MN550/080/0/551303238323.htm, 5 pages.

"Como Configure una fresadora en Vericut e activar G41 e G42 en el codigo G," Make it easy Tutoriales, May 28, 2013 [retrieved Nov. 14, 2017], https://www.youtube.com/watch?v=nl5Y3rYrV61, 5 pages.

\* cited by examiner

SYSTEM AND METHOD FOR CNC MACHINES AND SOFTWARE

CROSS-REFERENCE TO RELATED APPLICATIONS

This application is a continuation of U.S. application Ser. No. 14/489,258, filed Sep. 17, 2014, which is a non-provisional of and claims priority to U.S. Provisional Application Ser. Nos. 61/879,265 filed Sep. 18, 2013, and 61/950,642, filed Mar. 10, 2014. This application is related to U.S. application Ser. No. 13/942,481 filed Jul. 15, 2013, which claims the benefit of U.S. Provisional Application No. 61/672,205, filed Jul. 16, 2012. These applications are hereby incorporated herein by reference in their entirety for all purposes.

GOVERNMENT GRANT STATEMENT

The present disclosure may include embodiments that were funded in part by government grant DARPA-BAA-11-19 MENTOR.

FIELD

The present disclosure relates generally to computer numerical control (CNC) machines and more particularly, but not exclusively, to CNC machines and software for CNC machines.

Figure 1:
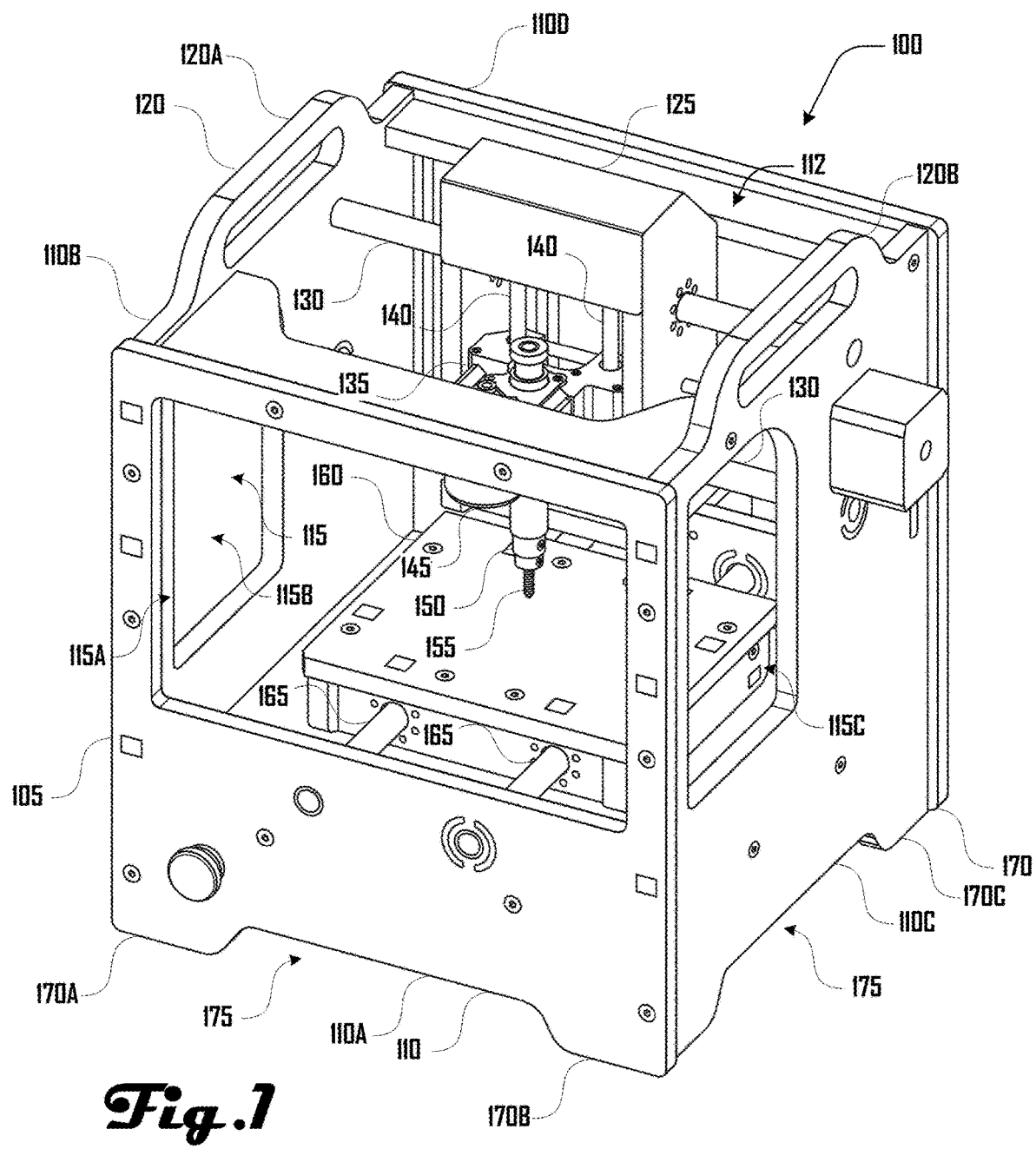
FIG. 1 is an exemplary perspective drawing illustrating an embodiment of a CNC milling machine in accordance with one embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

FIG. 1 is an exemplary perspective drawing illustrating an embodiment of a CNC milling machine 100 in accordance with one embodiment. The mill 100 comprises a housing 105 that includes four sidewalls 110; namely, a front-wall 110A, two peripheral walls 110B, 110C and a rear wall 110D that collectively define a cavity 112. The sidewalls further comprise windows 115; for example, the front-wall 100A comprises a front window 115A, the peripheral walls 110B, 110C comprise peripheral windows 115B, 115C. The peripheral walls 110B, 110C further comprise handles 120A, 120B at respective top ends of the peripheral walls 110B, 110C.

The mill 100 may also comprise internal housing components that provide for three dimensional movement of an endmill 155 relative to a work-piece. As shown in FIG. 1, the mill 100 further comprises an X-carriage 125 that translates within the cavity 112 on a pair of X-rods 130 that extend between the peripheral walls 110B, 110C. Additionally a Z-carriage 135 translates on a pair of Z-rods 140 disposed within the X-carriage. The Z-carriage 135 holds a motor 145 that rotates a chuck 150 that holds the endmill 155. A Y-bed 160 translates along Y-rods 165 that extend between the front and rear walls 110A, 110D.

For example, the X-carriage 125 provides for movement of the endmill 155 along an X-axis and the Z-carriage 135 provides for movement of the endmill 155 along a Z-axis. The Y-bed 160 is configured to move a work-piece coupled to the Y-bed 160 along a Y-axis. Accordingly, the endmill 155 is operable to move in three dimensions relative to a work-piece on the bed 160.

Various components of the mill 100 may be housed within a cavity below the bed 160, and a fan (not shown) may vent to a bottom of the mill 100, and vented air may be expelled from a plurality of vent slots 175 at the bottom of the walls 110 and defined by a portion of the walls 110 that may further optionally include a plurality of feet 170 (e.g., feet 170A, 170B, 170C) that set the mill 100 off from a surface.

In some embodiments, the mill 100 may be a desktop mill that is light, portable, and usable in homes and small workshops. For example, some embodiments of a mill 100 have dimensions of approximately 10 inches cubed, with a weight of approximately 15 pounds. Such embodiments may provide for improved handling and configuration of a mill 100. For example, while the mill 100 may be operated in a configuration with the feet 170 resting on a surface, it may also be desirable to rotate the mill 100 so that any one of the walls 110 is facing down, or such that the top of the mill 100 is facing down. Such configurations may be desirable because cuttings generated by the mill 100 during milling of a work-piece can fall through the windows 115. Such configurations are not possible with conventional mills due to the size and weight of such mills and also due to incompatible shape and location of windows.

FIG. 1 depicts open windows 115 on walls 110 of the housing 105; however, in some embodiments, the windows may be covered with a transparent or opaque material. In some embodiments, removable window coverings (not shown) may be selectively coupled with the windows 115. For example, one or more coverings may be coupled with the housing 105 via magnets, slots, pins, hooks or the like.

Various embodiments of a mill 100 may be any suitable size and shape, and the embodiments of a mill shown and described herein should not be considered to be limiting as to the sizes and shapes of a mill 100 in accordance with the present invention.

Figure 2:
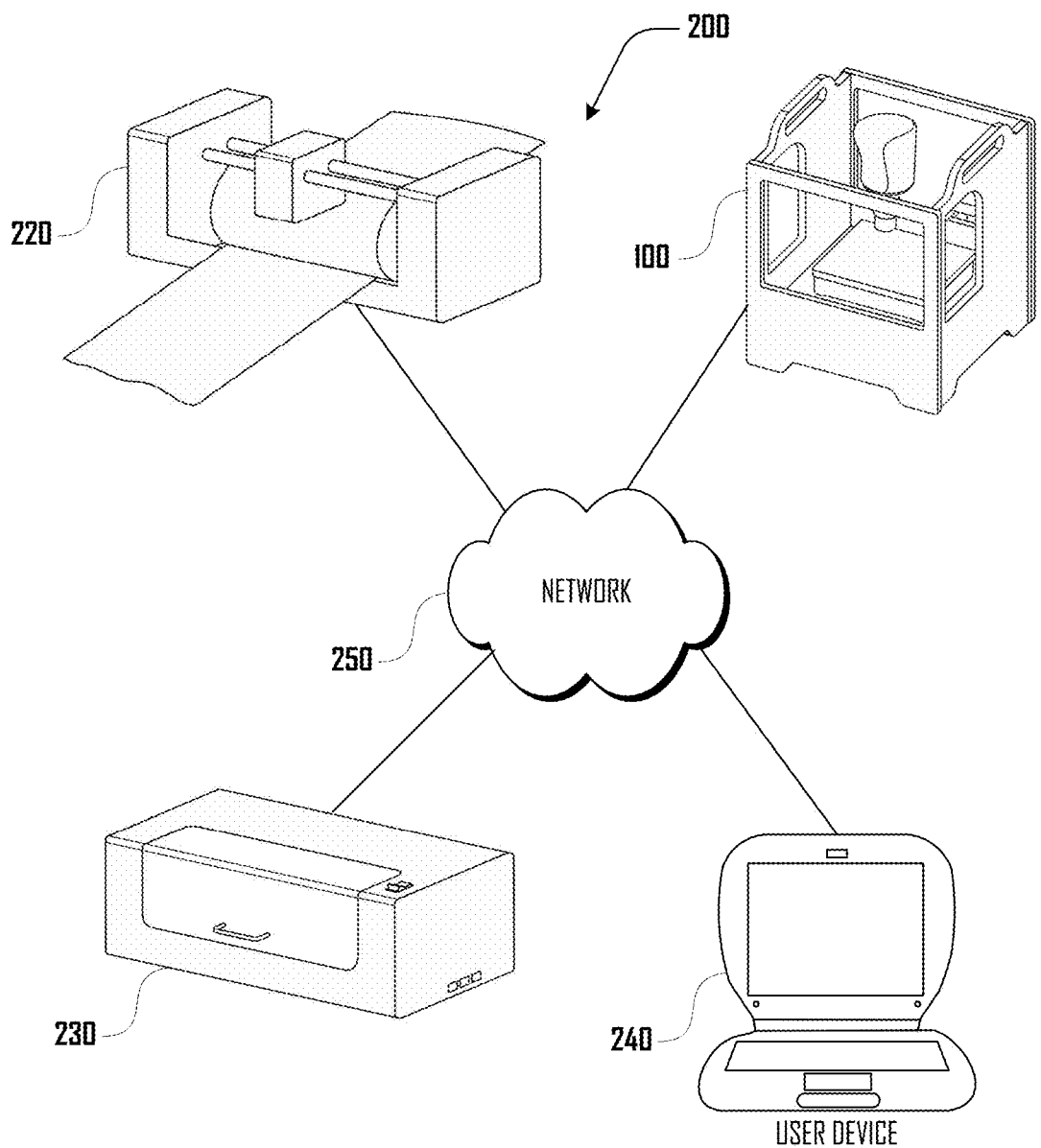
FIG. 2 is an exemplary network diagram illustrating an embodiment of a network comprising a milling machine, a laser cutter, and a CNC cutting machine in accordance with an embodiment.

FIG. 2 is an exemplary network diagram illustrating an embodiment of a network 200 comprising a milling machine 100, a CNC blade cutting machine 220, a laser cutter 230, and a user device 240 that are operably connected via a network 250 in accordance with an embodiment. In various embodiments, the mill 100 may be any suitable mill including the mill 100 described and shown in FIG. 1. The blade cutter 220 and laser cutter 230 may be any suitable blade or laser based cutting device.

The user device 240 may include a laptop computer as depicted in FIG. 2; however, any suitable user device may be used in various embodiments, including a desktop computer, smart phone, gaming device, smart glasses, smart watch, or the like. Other suitable devices may be present in such a network, including any suitable machining device, paper printer, three-dimensional printer, robot, and the like, without limitation. Devices that may part of a network 200 in some embodiments, may be absent in some embodiments, or may be present in plurality in some embodiments.

The network 250 may comprise any suitable wired or wireless network, including the Internet, a local area network ("LAN"), a wide area network ("WAN") a Wi-Fi network, a BlueTooth network or the like. In some embodiments, suitable devices 100, 220, 230, and the like may, be directly connected to a user device 240 via a Universal Serial Bus ("USB") connection.

In various embodiments, it may be desirable to provide for the identification and control of various devices 100, 220, 230, and the like, that may form a part of a network 200. For example, a user that desires to manufacture a given product or part may create a network 200 of manufacturing devices that can be controlled via a single device and interface. As discussed in further detail herein, any suitable device may be included or removed from the network 200, and the identity and configuration of the connected manufacturing devices may be automatically determined as such devices join the network. Customized device networks 200 may be created for certain manufacturing applications 200.

For example, in one embodiment, a user may control a plurality of desktop manufacturing devices via a user device 240 to modify one or more work-piece in the plurality of manufacturing devices. Some embodiments include a device network 200 where all of the manufacturing devices, or the like, are proximate to the user device (e.g., in the same room). However in some embodiments, any of the devices 100, 220, 230, 240 may be in disparate locations compared to one another. For example, in one embodiment, a user device 240 may control a plurality of manufacturing devices remotely over the Internet, and the manufacturing devices may or may not be in the same location from user device 240 or from each other.

Accordingly, the following figures depict systems and methods for controlling and interacting with one or more manufacturing device. While the following example embodiments relate primarily to a mill 100, the systems and methods discussed may be applied to any suitable network configuration having one or more suitable device or machine.

Figure 3:
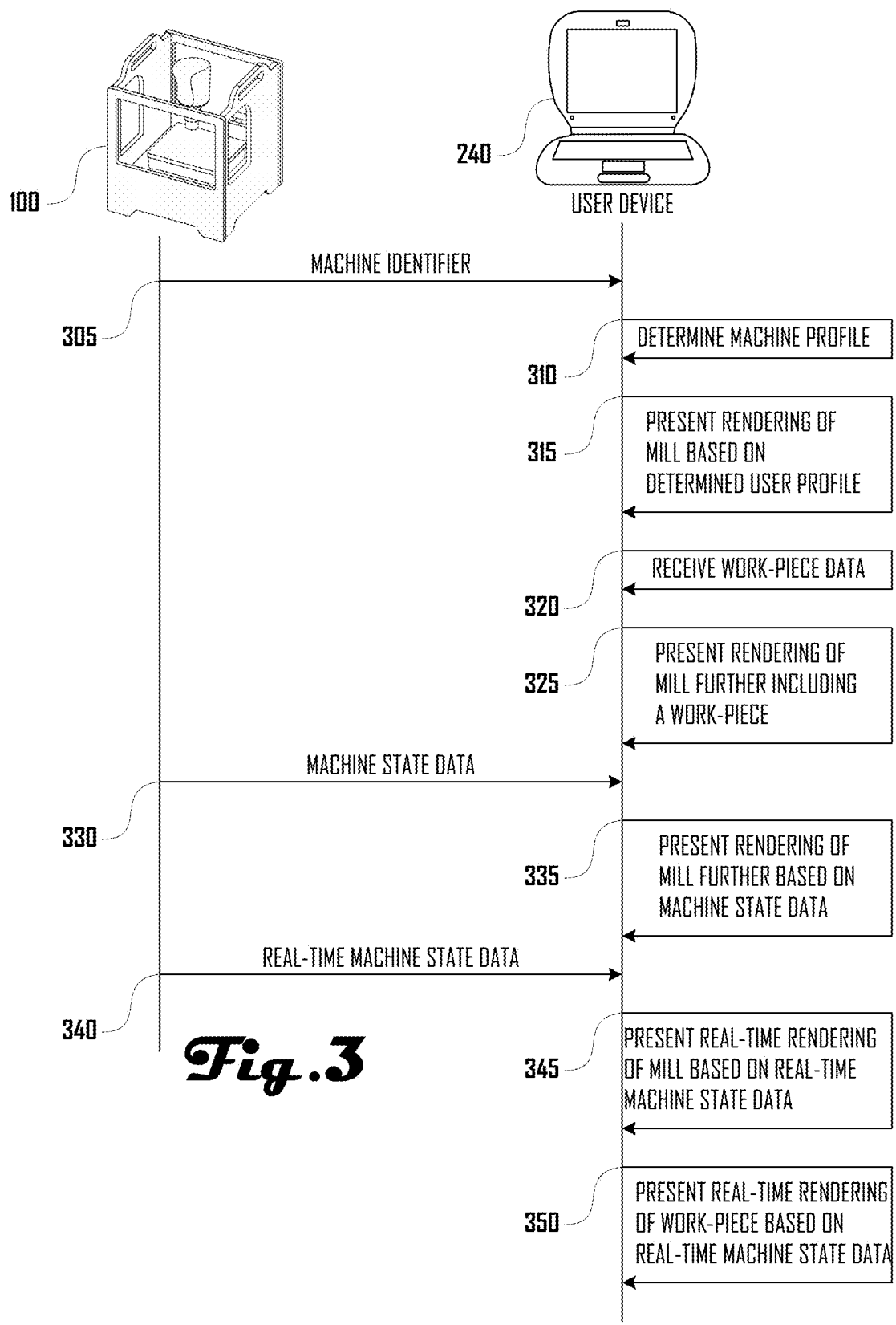
FIG. 3 is an exemplary data flow diagram illustrating data flow between a mill and a user device in accordance with one embodiment.

FIG. 3 is an exemplary data flow diagram illustrating data flow between a mill 100 and a user device 240 in accordance with one embodiment. The data flow begins at 305 where a machine identifier is received from the mill 100 at the user device 240, where a machine profile is determined at 310. A machine identifier may be any suitable identifier in various embodiments. For example, a machine identifier may be a global unique identifier (e.g., a Medium Access Control ("MAC") address) that uniquely identifies a given device or machine. A machine identifier may include an indicator associated with a make, model, serial number, configuration, or the like, of a device or machine in addition to or in lieu of a MAC address.

In various embodiments, a portion of a machine identifier may be associated with a machine or device profile. A machine profile may include various information about a given machine, or a model of machine, including physical dimensions; three dimensional rendering data; date regarding possible machine configurations; machine limitation data; motor strength data; motor speed data; compatible endmill data; minimum and maximum chuck size data; and the like. Such a profile may include any suitable data that provides for rendering and/or operating of a machine as further described herein.

In some embodiments, the user device 240 may store a plurality of machine or device profiles and use suitable profile data based on one or more device or machine that may be operably connected with the user device 240. In some embodiments, machine or device profiles may be stored on a remote device (e.g., a server) and such profile data may be retrieved by the user device 240 when necessary. For example, where the user device 204 receives a machine identifier, a determination may be made that a suitable machine profile is not stored on the user device 240, and a suitable machine profile present on a remote device may be identified and used either remotely or downloaded to the user device 240.

Returning to the communications of FIG. 3, a rendering of the mill 100 is presented on the user device 240, at 315. At 320, work-piece data is received at the user device 240, and a rendering of the mill 100 is presented that further includes a work-piece rendering based on the received work-piece data. User interfaces and presentation of machine or device renderings including a work-piece rendering is illustrated and discussed in further detail herein. (See e.g., FIGS. 8-14d)

In some embodiments, work-piece data may be input at the user device 240. For example, a user may input dimensions of a work-piece or other data that describes a work-piece in three dimensions. For a cuboid work-piece, height, length and width may be provided by a user. In some embodiments, for a work-piece of irregular shape, work-piece data may comprise CAD data, parametric data, or other suitable data that indicates the shape and size of a work-piece.

In some embodiments, work-piece data may include data generated by a mill 100 or user device 240. For example, as further described herein, a work-piece may be cut by a mill 100, and such cutting of the work-piece may be tracked such that when the cut work-piece is transferred to second machine or mill, the shape and cutting that occurred on the work-piece can be rendered in association with the second machine or mill. Such data may be stored on a server, a user device 240, or on a suitable machine or device. Accordingly, in some embodiments, work-piece data may be loaded from a memory on the user device 240, or may be received from a server, machine or device. In further embodiments, work-piece data may be physically or visually determined by sensors associated with the mill 100.

Work-piece data may also include data regarding one or more material that comprises a work-piece. For example, in various embodiments, it may be desirable to account for material properties when generating a cutting path and method for cutting a work-piece. Different materials (e.g., wood and metal) may have different physical properties that may require certain endmills, endmill rotational speed, endmill translational speed, lubrication, heat dissipation, or the like.

In some embodiments, a user may select one or more materials or characteristics of a work-piece. For example, the user may generally indicate that a work-piece consists of a class of materials, such as wood or metal or may more specifically indicate the type of material that the work-piece is made of, such as by specifying that is made of aluminum or pine wood. In further embodiments, materials or characteristics of a work-piece may be physically or visually determined by sensors associated with the mill 100.

Additionally, in some embodiments, a work-piece may comprise a plurality of materials in any suitable configuration, and data specifying the location and type of the plurality of materials and/or other data describing a given work-piece may be provided to the user device 240. For example, in some embodiments, work-pieces may comprise one or more layers and be available to users in specific dimensions and configurations that are associated with a work-piece profile or the like. Users may then provide a work-piece profile or indicator, which comprises the specifications of the standardized work-piece.

Work-piece data may also include data regarding position of the work-piece relative to the mill 100, or the like. For example, referring to FIG. 1, a work-piece may be coupled to the bed 160 of a mill 100, and the work-piece may be milled by movement of the bed 160 and work-piece relative to movement of the endmill 155. For a cutting path to be generated that will cut the work-piece in a desired way, the position of the work-piece on the bed 160 must be known. Position data of a work-piece on the bed 160 may be obtained in any suitable way. For example, in some embodiments, a user may measure the location of the work-piece, the work-piece may be held by a frame, guide or template that provides for indication of position on the bed 160, or position may be physically or visually determined by sensors associated with the mill 100.

Returning to FIG. 3, machine state data is sent from the mill 100 to the user device 240, at 330, and a real-time rendering of the mill 100 is presented that is further based on the machine state data, at 345. At 350, a real-time rendering of the work-piece is presented based on real-time machine state data.

Machine state data may be any suitable data related to the position of portions of the mill 100 or component configurations of the mill 100. For example, machine state data may comprise an indication of the position of the X-carriage 125 on the X-rods; the position of the Z-carriage 135 on the Z-rods 140; and the position of the Y-bed 160 on the Y-rods. Machine state data may also comprise data such as an identifier of an endmill 155 that may be present in the chuck 150, position of the endmill 155, an identifier of a frame, guide or template present on the bed 160, or the like.

In various embodiments, a rendering of the mill 100 may be generated that replicates the current state of the mill 100. (See e.g., FIGS. 8-12). This may be desirable so that a user can view and manipulate a rendering that directly corresponds to the physical mill 100. In various embodiments, machine state data may be stored on a memory present in the mill 100. In other embodiments, machine state data may be stored in removable memory, in other network locations or other locally or network-accessible locations.

Additionally, it may also be desirable to provide a rendering of the work-piece being milled in real-time. (See e.g., FIGS. 9 and 10). For example, because the position of the work-piece on the bed 160 is known, and because the position of the bed 160 is known in relation to a tip of the endmill, the cutting of a work-piece may be determined and rendered to a user. It may therefore be assumed based on position data that the endmill is cutting (or has cut) the work-piece, when a portion of the endmill contacts the rendered work-piece; when a portion of the rendered endmill is within the boundaries of the rendered work-piece, or when a portion of the rendered endmill has previously been in contact with or within the boundaries of the rendered work-piece. Accordingly, cuts in the work-piece may be determined and rendered in real-time. As discussed herein, present and historical work-piece state data may be stored in the mill 100 and/or at the user device 240.

Returning to the communications of FIG. 3, at 340 real-time machine state data is received by the user device 240 and a real-time rendering of the mill 100 based on the real-time machine state data is presented. For example, real-time machine state data may comprise an indication of the position of and movement of the X-carriage 125 on the X-rods; the position of and movement of the Z-carriage 135 on the Z-rods 140; and the position of and movement of the Y-bed 160 on the Y-rods. Real-time machine state data may also comprise data such as an identifier of an endmill 155 that may be present in the chuck 150, the position and movement of an endmill 155, an identifier of a frame, guide or template present on the bed 160, or the like.

In various embodiments, a real-time rendering of the mill 100 may be generated that replicates the current state of the mill 100, including real-time rendering of movement of various portions of the mill 100. This may be desirable so that a user can view and manipulate a rendering that directly corresponds to the physical mill 100 in real-time. In various embodiments, real-time machine state data may be stored on a memory present in the mill 100. While machine state data and real-time machine state data may be determined based on the indicated position of moving components of the mill 100, machine state data and real-time machine state data may also or alternatively be physically or visually determined by sensors associated with the mill 100.

Figure 4:
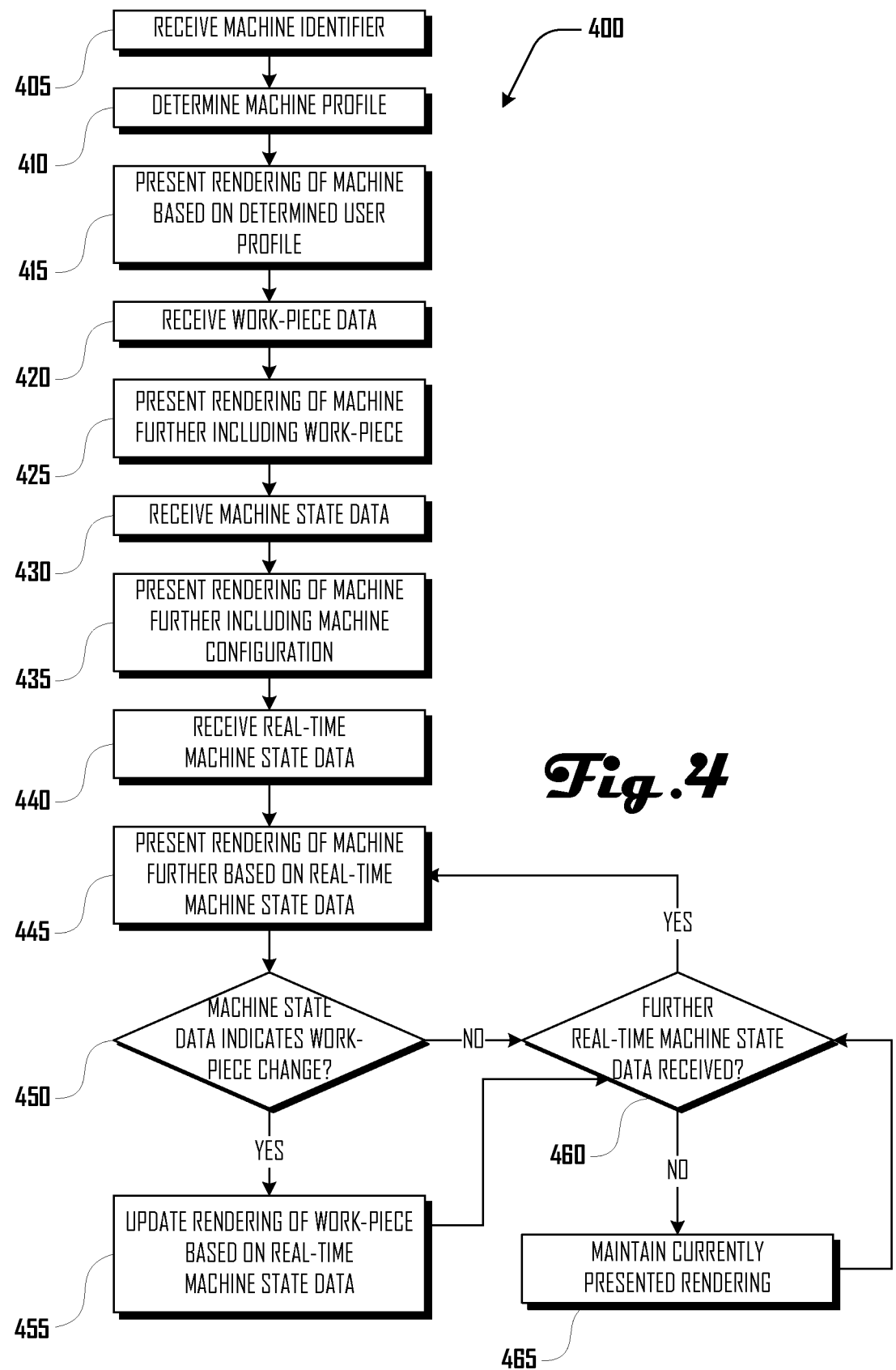
FIG. 4 is an exemplary flow chart illustrating an embodiment of rendering a machine and work-piece.

FIG. 4 is an exemplary flow chart illustrating an embodiment of a method 400 of rendering a machine and work-piece. The method 400 begins in block 405 where a machine identifier is received, and in block 410, a machine profile is determined. In block 415, a rendering of the machine is presented based on the determined user profile. In block 420, work-piece data is received, and in block 425, a rendering of the machine is presented that further includes a rendering of a work-piece. In block 430, machine state data is received, and in block 435, a rendering of the machine is presented that further includes the configuration of the machine. In block 440, real-time machine state data is received, and in block 445, a rendering of the machine is presented that is further based on real-time machine state data.

The method 400 continues to decision block 450, where a determination is made whether real-time machine state data indicates a work-piece change, and if so, the method 400 continues to block 455 where the rendering of the work-piece is updated based on the real-time machine state data and the method 400 continues to decision block 460.

However, if a determination is made in block 450 that machine state data does not indicate a work-piece change, the method 400 continues to decision block 460 where a determination is made whether further real-time machine state data is received. If no further real-time machine state data is received, the method 400 continues to block 465 where the currently presented rendering is maintained, and the method 400 cycles back to decision block 460, where the method 400 waits until further real-time machine state data is received, and if so, the method 400 cycles back to block 445 where a rendering based on the further real-time machine state data is received.

For example, a user device 240 may continuously receive real-time machine state data from a mill 100 and display a real-time rendering of the mill 100 as it moves and cuts a work-piece. The rendering may directly correspond to the movement and cutting that is occurring at the mill 100 and cuts to the work-piece may be determined based on a known location of the work-piece coupled to a portion of the mill 100, based on known movement of portions of the mill 100, and based on known location of the endmill 155.

Figure 5:
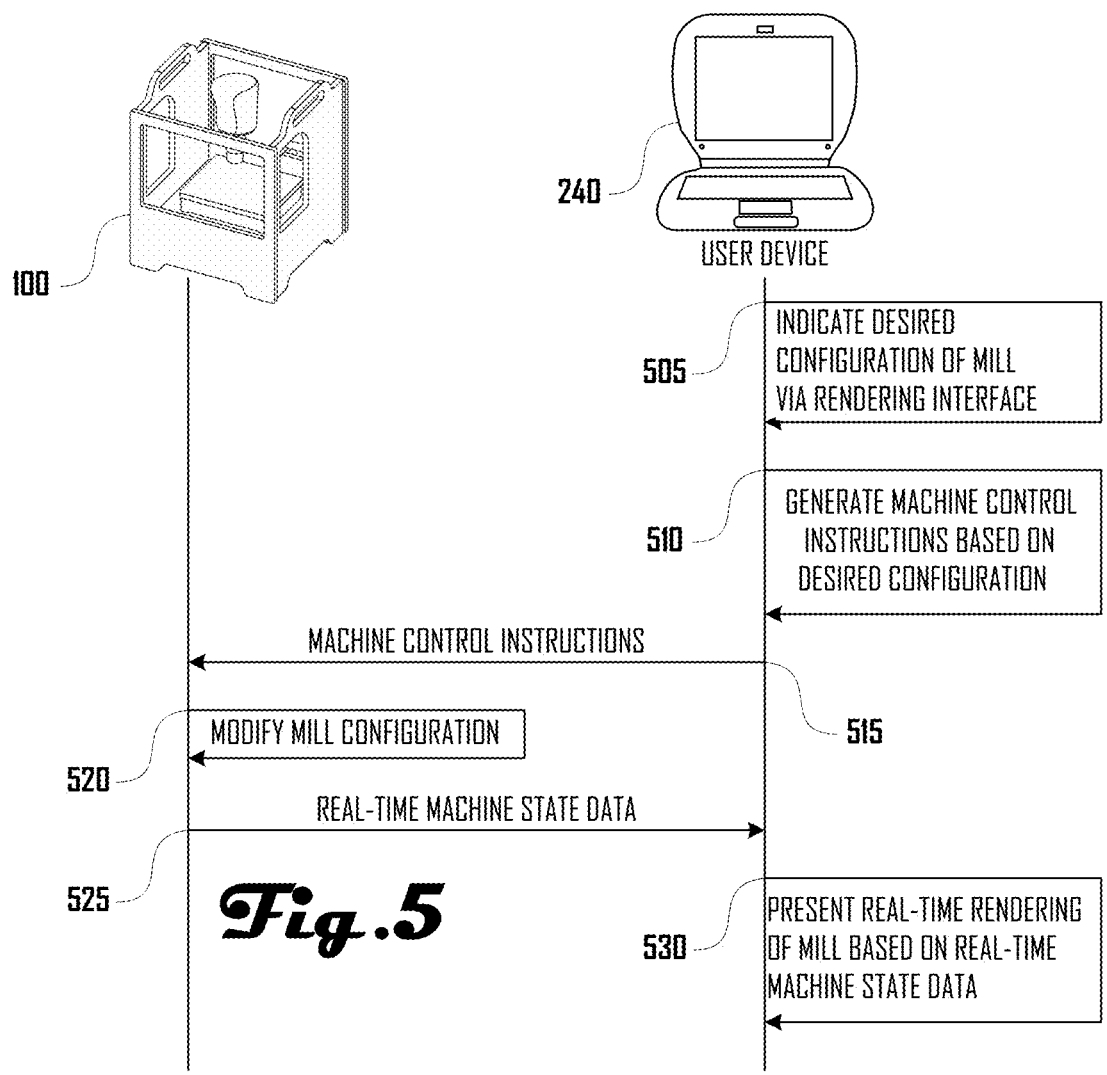
FIG. 5 is an exemplary data flow diagram illustrating data flow between a mill and a user device in accordance with another embodiment.

FIG. 5 is an exemplary data flow diagram illustrating data flow between a mill 100 and a user device 240 in accordance with another embodiment wherein the mill 100 is controlled via the user device 240. The communications begin at 505 where a desired configuration of the mill 100 is indicated via an interface, and at 510, machine control instructions are generated based on the indicated desired configuration. The machine control instructions are sent to the mill 100, at 515 and the mill configuration is modified at 520. At 525, real-time machine state data is sent to the user device, at 525, and a real-time rendering of the mill 100 is presented based on the real-time machine data, at 530.

A user may indicate a desired configuration of the mill in various suitable ways. For example, as described herein the user device 240 may display an interface with a proportional three dimensional rendering that shows the position of physical mill 100. In some embodiments, a user may move the mill in real-time or near-real-time by clicking buttons, holding buttons dragging portions of the three dimensional rendering, or the like. In such an embodiment, as the user indicates movement of the rendered mill in the interface, the physical mill 100 will move in kind in real-time or near-real time. In other words, as the user generates instructions via the interface, both the physical mill 100 and rendered mill will move in unison or near-unison.

In some embodiments, a desired sequence of configurations may be indicated and then provided to the mill 100 for execution. For example, a user may provide a series of movement instructions via the interface, and these desired movements may be depicted by the rendering of the mill, but not yet performed by the physical mill 100. The desired set of instructions may then be provided to the mill 100 (e.g., by clicking an "execute" or "send" button), and the mill 100 may then perform the instructed movements and the rendering of the mill on the user device 240 may depict such actions in real-time or near real-time.

In further embodiments, a desired configuration of the mill 100 may be indicated in various suitable ways. For example, a user may directly import a CAD file that corresponds with a desired final cutting state of a work-piece. The user device 240 may determine a cutting path that mills the work-piece into the desired shape, and such a generated cutting path may be provided to the mill 100. The cutting of the work-piece may be rendered in real-time or near-real time by the user device 240.

Figure 6:
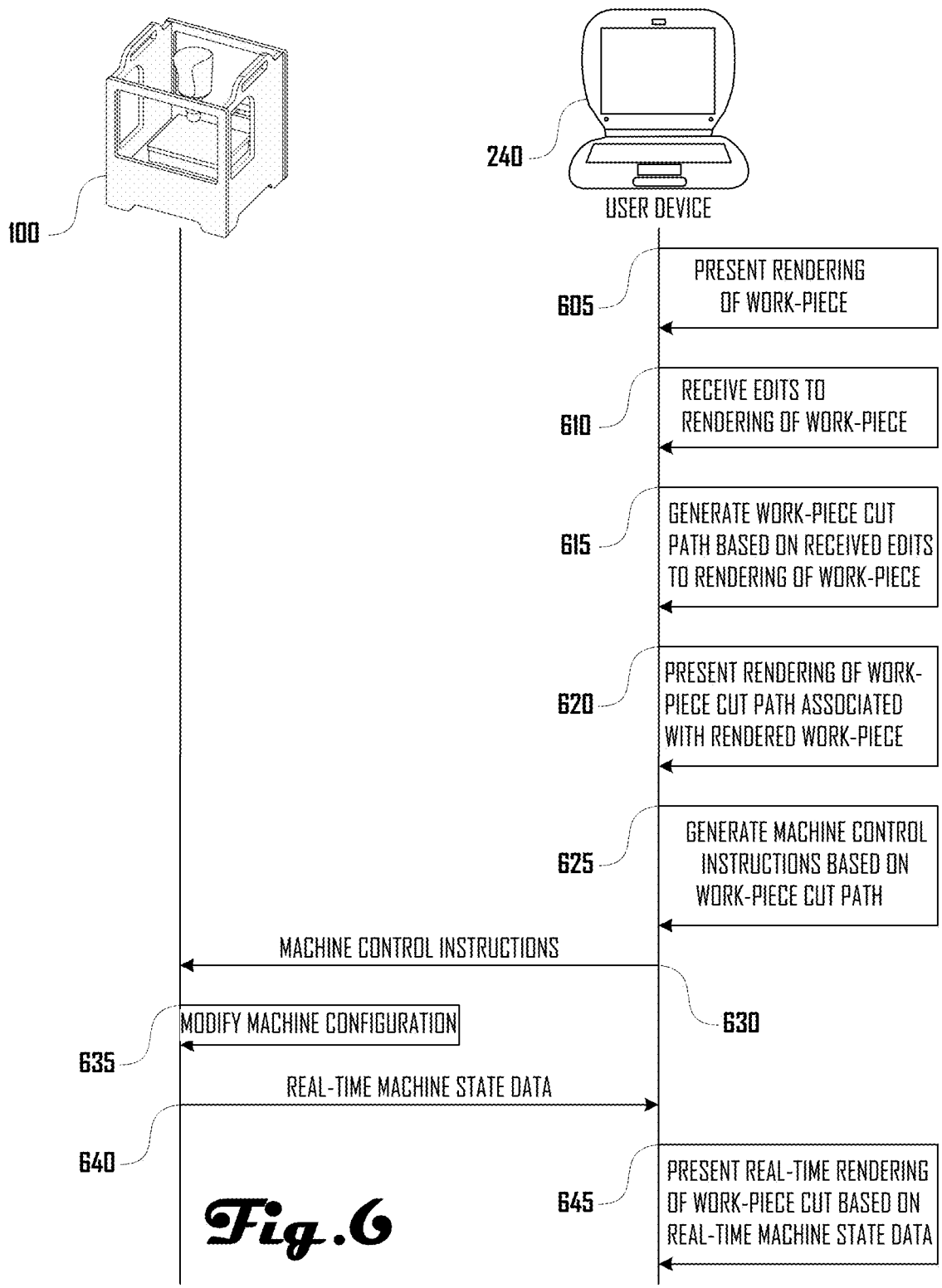
FIG. 6 is an exemplary data flow diagram illustrating data flow between a mill and a user device in accordance with a further embodiment.

In further embodiments, a user may edit a three dimensional rendering of a work-piece as described herein using graphical user interface tools or otherwise, and such editing may be used to generate a cutting path, which in turn can be provided to the mill 100. (See e.g., FIGS. 13a-14d). FIG. 6 is an exemplary data flow diagram illustrating data flow between the mill 100 and user device 240 in accordance with a further embodiment, wherein a rendering of a work-piece is modified to generate a cutting path for the mill 100. In other embodiments the user may designate a cutting path using other known data input operations, including through for example, a command line interface or customized script.

The communications begin at 605 where a rendering of a work-piece is presented, and at 610 edits to the work-piece are received. For example, as shown and described in further detail herein, a three dimensional rendering of a work-piece may be modified via an interface presented on the user device 240. The modifications to the rendered work-piece may be used to determine or generate a cut path that will mill the work-piece in the she shape indicated by the modified rendering.

In various embodiments, the physical limitations, constraints or abilities of the mill 100 and/or endmill may be used when providing limitations, constraints or abilities for editing or modifying a work-piece rendering. For example, some combinations of a mill 100 and endmill 155 may be incapable of forming overhanging structures, or the like. Accordingly, the ability to create such structures when editing a work-piece rendering may be prevented.

Similarly, physical limitations, constraints or abilities of a work-piece may be used when providing limitations, constraints or abilities for editing or modifying a work-piece rendering. For example, a work-piece may have physical characteristics that make certain features structurally unsound or that cannot be produced within the tolerances of a given mill 100 and endmill 155 combinations. Accordingly, the ability to create such structures when editing a work-piece rendering may be prevented or a user may be warned against generating such structures.

In further embodiments any suitable device or machine profile data may be used to determine limitations, constraints or abilities for editing or modifying a work-piece rendering, and such limitations, constraints or abilities for editing or modifying a work-piece rendering may be changed based on a given combination or configuration of a machine, device, endmill, cutting implement or the like.

Figure 7:
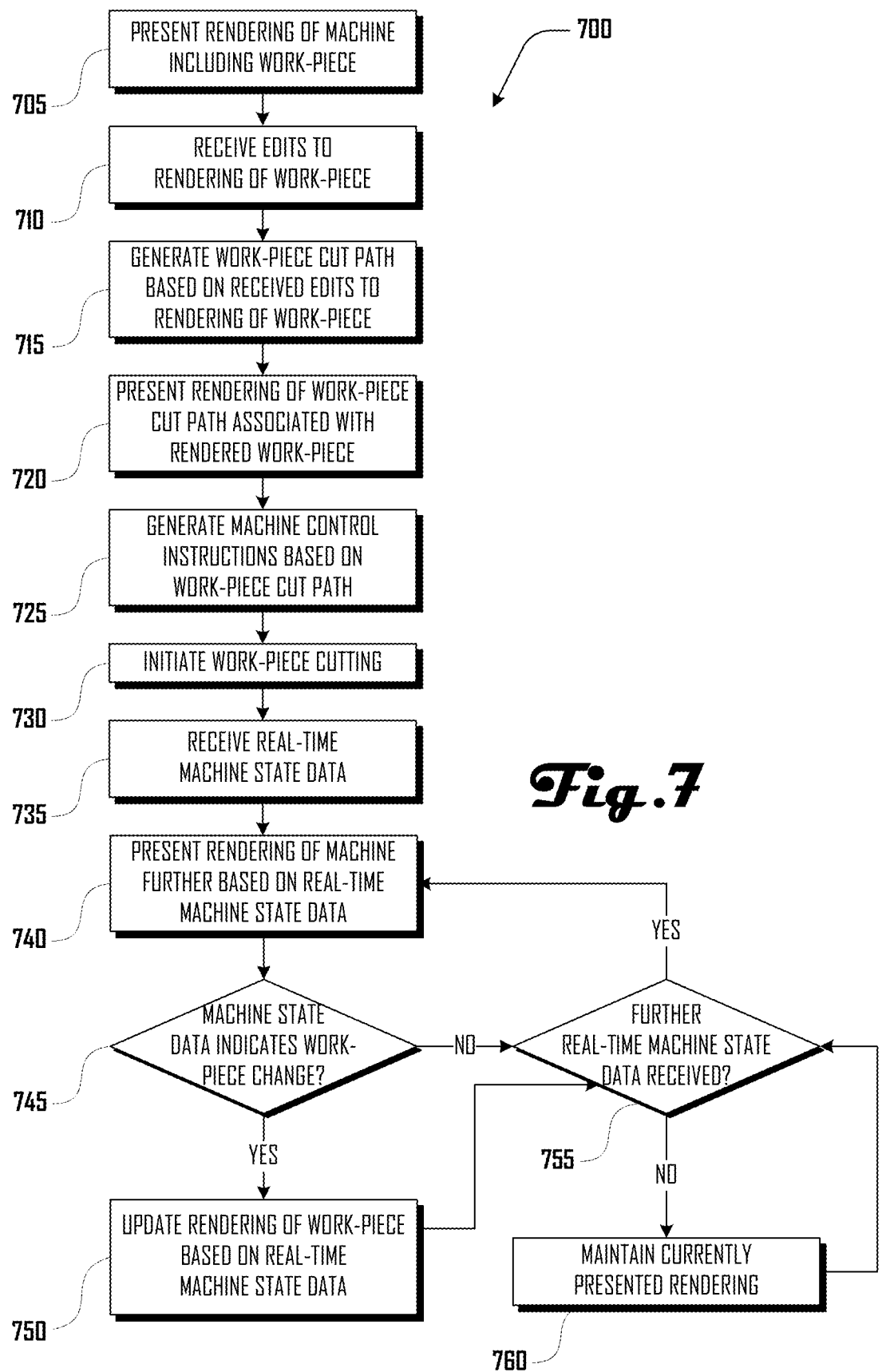
FIG. 7 is an exemplary flow chart illustrating an embodiment of rendering a work-piece.

FIG. 7 is an exemplary flow chart illustrating an embodiment of a method 700 for rendering a work-piece. The method begins in block 705 where a rendering of a machine including a work-piece is presented, and in block 710, edits to the work-piece are received. In block 715, a work-piece cut path is generated based on the received edits to the rendering of the work-piece, and in block 720, a rendering of the work-piece cut path associated with the rendering of the work-piece is presented. Presentation of a work-piece cut path is described and illustrated in further detail herein. (See e.g., FIGS. 8-10).

In block 725, machine control instructions are generated based on the work-piece cut path, and in block 730 work-piece cutting is initiated. In block 735, real-time machine state data is received, and in block 740 a rendering of the work-piece cutting based on real-time machine state data is presented.

The method 700 continues to decision block 745, where a determination is made whether real-time machine state data indicates a work-piece change, and if so, the method 700 continues to block 750 where the rendering of the work-piece is updated based on the real-time machine state data and the method 700 continues to decision block 755.

However, if a determination is made in block 745 that machine state data does not indicate a work-piece change, the method 700 continues to decision block 755 where a determination is made whether further real-time machine state data is received. If no further real-time machine state data is received, the method 700 continues to block 760 where the currently presented rendering is maintained, and the method 700 cycles back to decision block 755, where the method 700 waits until further real-time machine state data is received, and if so, the method 700 cycles back to block 740 where a rendering based on the further real-time machine state data is received.

For example, a user device 240 may continuously receive real-time machine state data from a mill 100 and display a real-time rendering of the mill 100 as it moves and cuts a work-piece. The rendering may directly correspond to the movement and cutting that is occurring at the mill 100 and cuts to the work-piece may be determined based on a known location of the work-piece coupled to a portion of the mill 100; may be determined based on known movement of portions of the mill 100; and may be determined based on a known location of the endmill 155.

Figure 8:
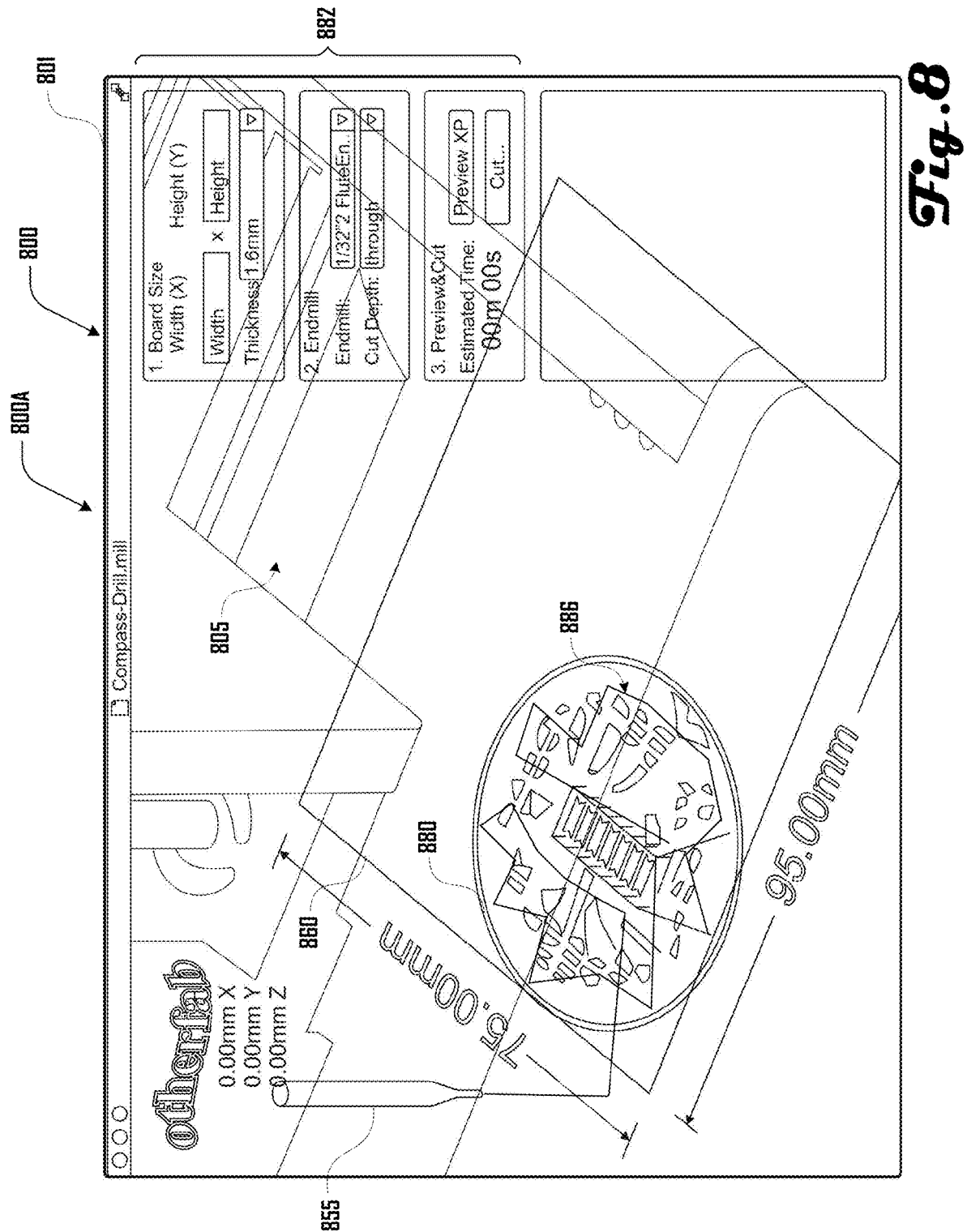
FIG. 8 is an exemplary embodiment of a user interface depicting a rendering of a machine and work-piece.

FIGS. 8-12 depict exemplary user interfaces 800A-E in accordance with various embodiments. The interface 800A depicted in FIG. 8 illustrates an example of an interface depicting a preview of a cut work-piece. The interface 800 includes interface window 801 that presents a rendering of a machine 805, which includes an endmill 855, a bed 860, a work-piece 880 coupled with the bed 860, and a cut path 886 imposed on the work-piece 880. The interface further includes a first menu 882 that may comprise selections and indications related to the work-piece, the endmill, cutting of the work-piece, and a preview of cutting the work-piece.

The embodiment of the interface 800A shown in FIG. 8 depicts an example of the interface 800 where a preview of the cut work-piece 880 is generated and displayed along with a generated and displayed cut path 886. The endmill 855 is shown in a home position before the cutting begins, and the cut path line 886 shows where the endmill 855 will travel to generate the cut work-piece. Certain rendered portions of the machine 805 may be shown in more or less detail, and may be depicted as transparent, translucent or opaque in various embodiments. For example, the endmill 855, work-piece 880 and bed 860 may be depicted as being partially translucent so that their relation to other portions of the machine can be perceived. Such other portions of the machine 805 may be depicted in less detail as shown in FIG. 8.

Figure 9:
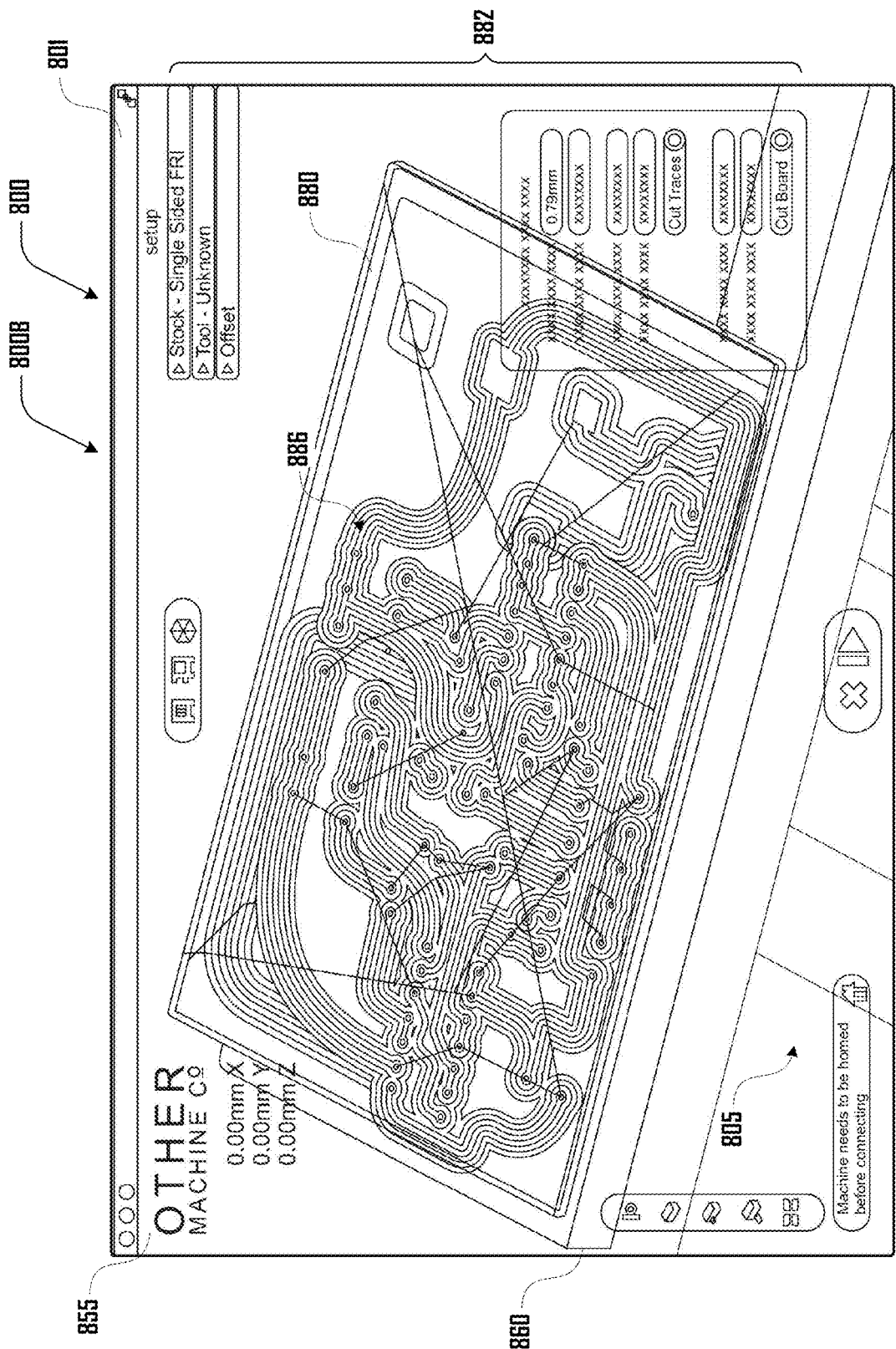
FIG. 9 is another exemplary embodiment of a user interface depicting a rendering of a machine and work-piece.
Figure 10:
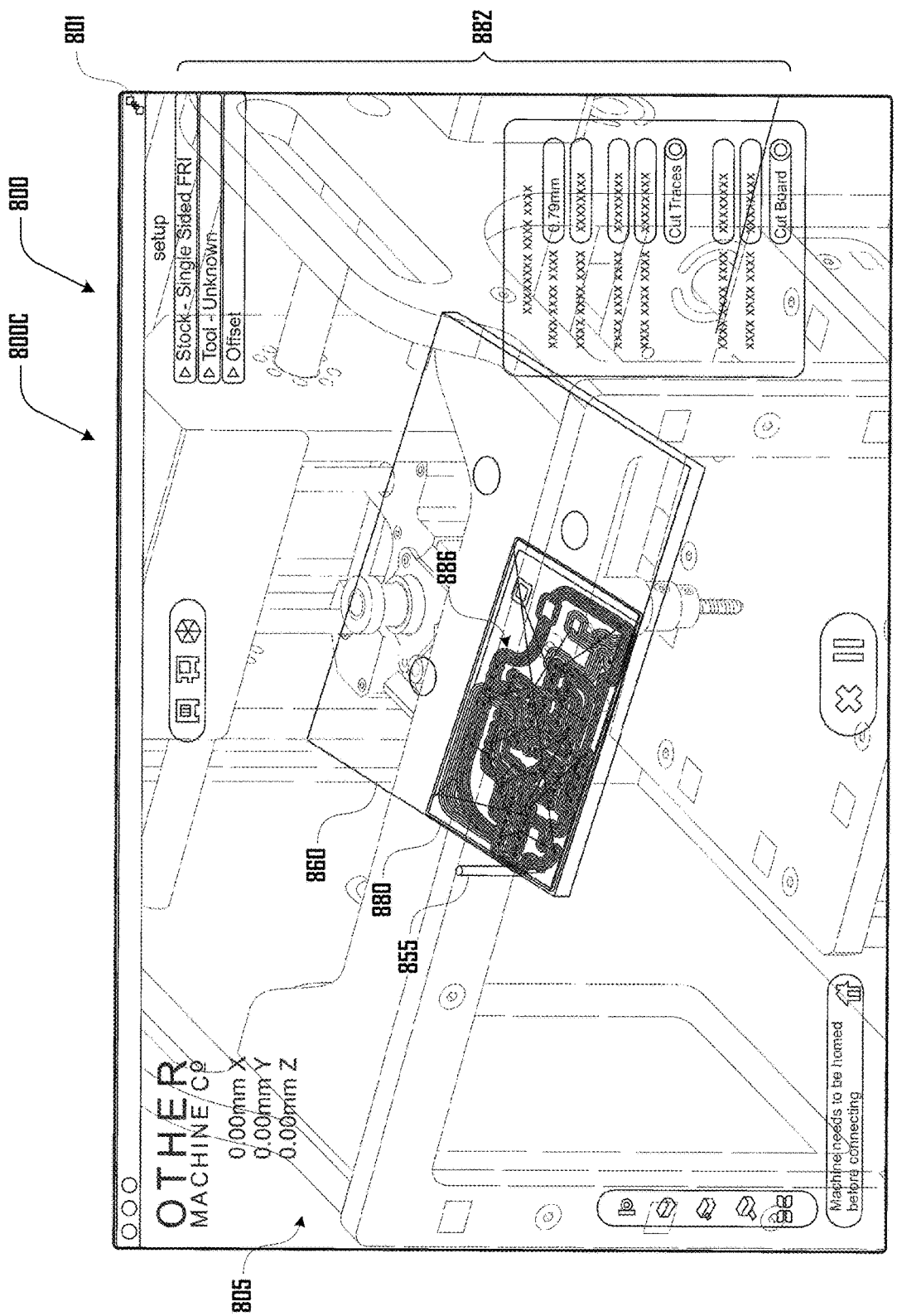
FIG. 10 is still another exemplary embodiment of a user interface depicting a rendering of a machine and work-piece.

In further embodiments, the interface may depict a rendering of a machine 805 during cutting of the work-piece. For example, FIG. 9 depicts an embodiment 800B where the work-piece is being cut, but where the endmill 855 has been raised from the work-piece 880. FIG. 10 depicts and embodiment 800C where the work-piece 855 is shown cutting the work-piece 880.

Figure 11:
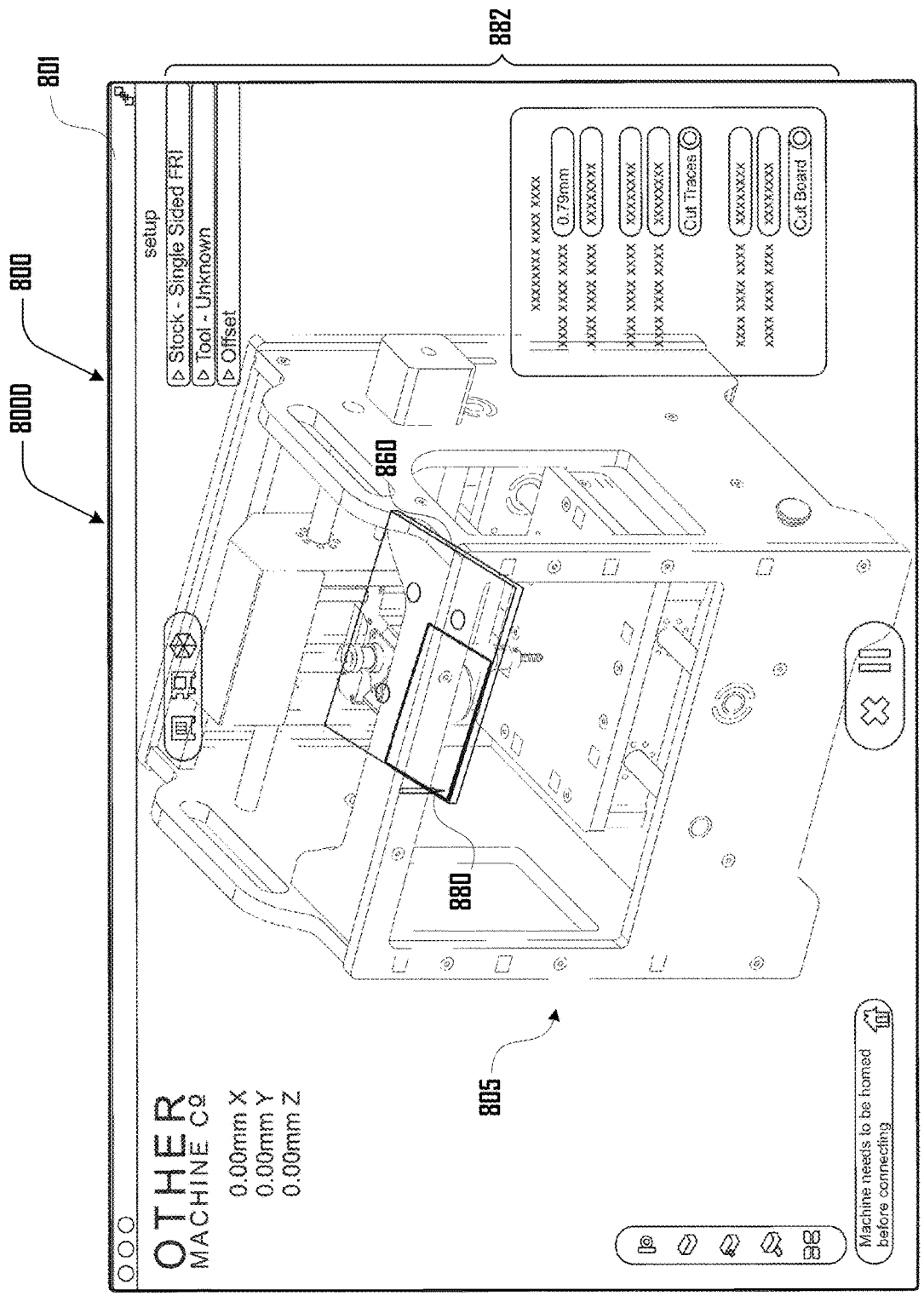
FIG. 11 is a further exemplary embodiment of a user interface depicting a rendering of a machine and work-piece.
Figure 12:
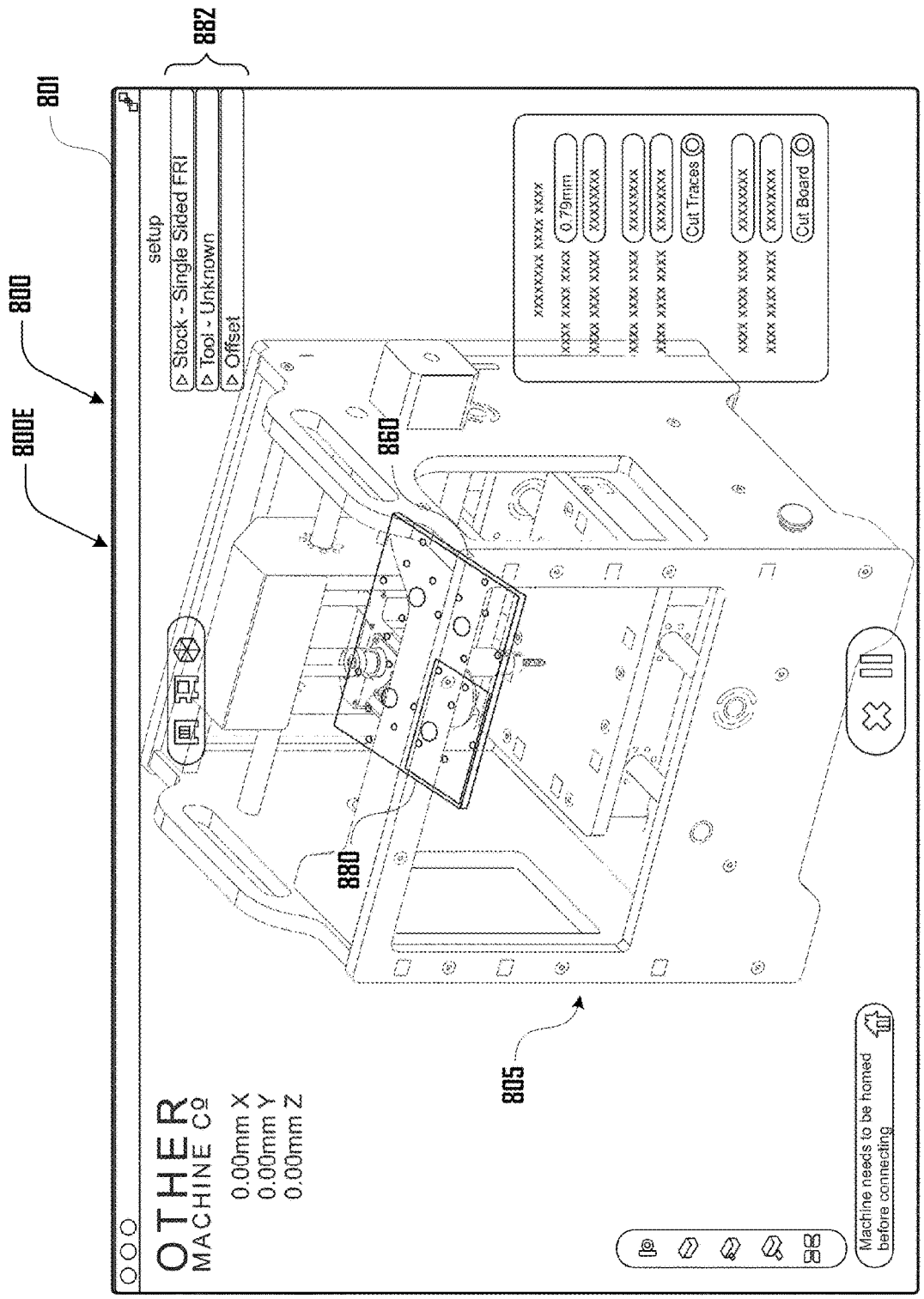
FIG. 12 is a still further exemplary embodiment of a user interface depicting a rendering of a machine and work-piece.

In other embodiments, such as embodiment 800D shown in FIG. 11 the machine 805 is depicted before work-piece cut data is imported and displayed. In still further embodiments, such as embodiment 800E shown in FIG. 12 the machine 805 is depicted in a pre-setup state.

In various embodiments, the interface 800 and milling machine 100 may be operable without an intermediary numerical control (NC) format. For example, the interface and/or the machine 100 may read and/or convert a CAD drawing directly (without need for generating G-code, or the like). In other embodiments, information that is generated by through user edits made through the interface 800 may be converted and exported directly in formats compatible with CAD programs or other data formats for use in other design or analysis software tools.

Figure 13A:
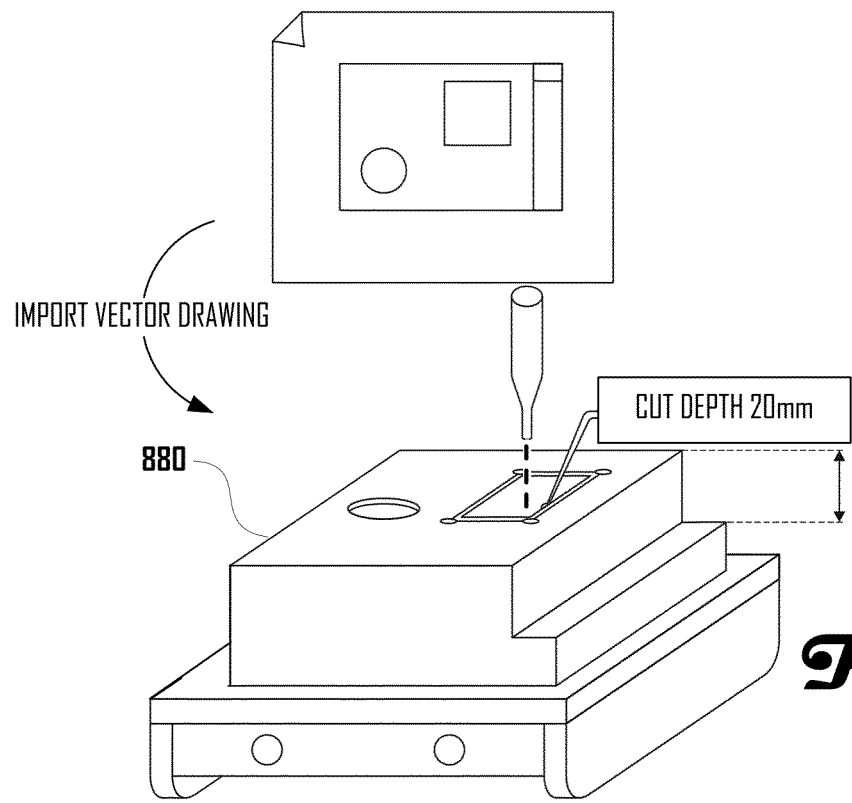
FIGS. 13a-b depict an embodiment of a user interface for three dimensional editing of a virtual work-piece.
Figure 13B:
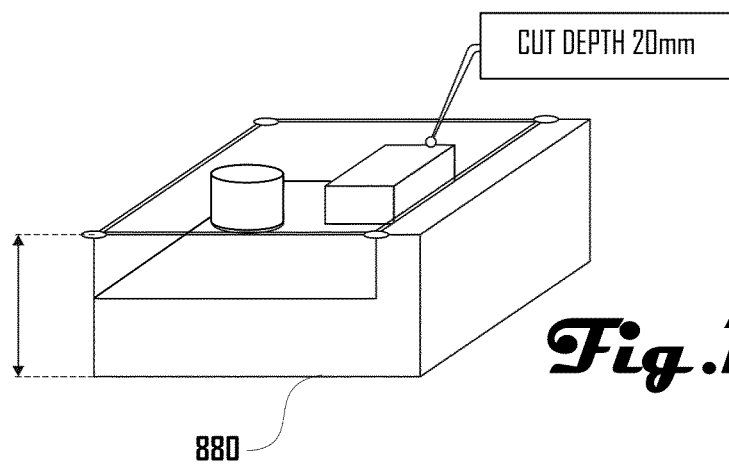
Figure 14A:
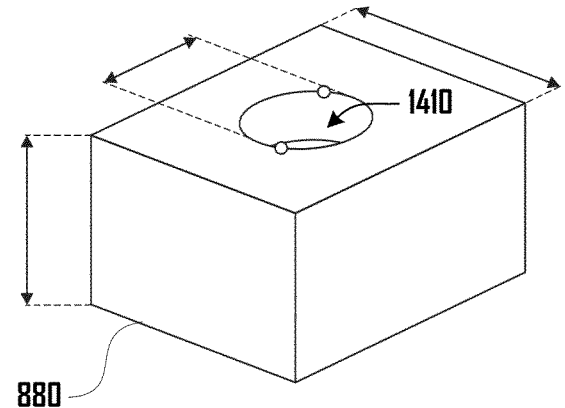
FIGS. 14a-d depict another embodiment of a user interface for three dimensional editing of a virtual work-piece.
Figure 14B:
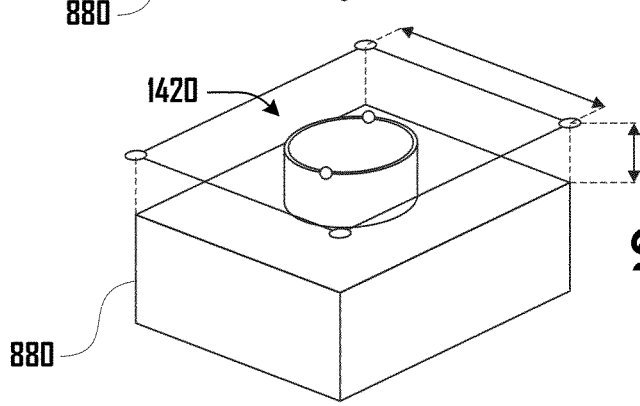

For example, FIG. 13a depicts one embodiment where a vector drawing (e.g., in .svg format) is imported into the interface 800 (FIGS. 8-12), and a rendering of the work-piece 855 (FIGS. 8-12) and target work-piece state is generated along with a cutting path. As depicted in FIG. 13b (and further shown in FIGS. 14a-14d), CAD functionalities in the interface allow the rendering to be edited, which may change the target work-piece state and change the generated cutting path. As depicted in FIGS. 14a-14d, a CAD interface may allow the user to draw and design a cylinder cut 1440. FIG. 14a depicts a rendered work-piece 880 where a cylindrical cavity 1410 is generated by indicating a circle on a two dimensional plane of the work-piece and extending the circle in a third dimension perpendicular to the two dimensional plane. By taking the inverse of the body generated in FIG. 14a, a solid positive cylinder 1420 can be generated as depicted in FIG. 14b.

Figure 14C:
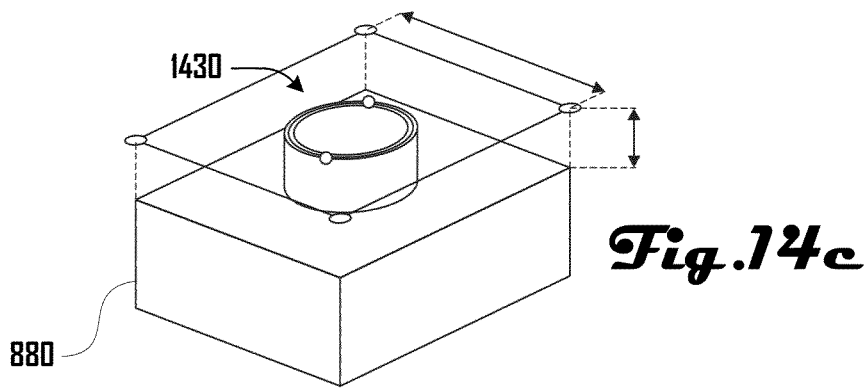
Figure 14D:
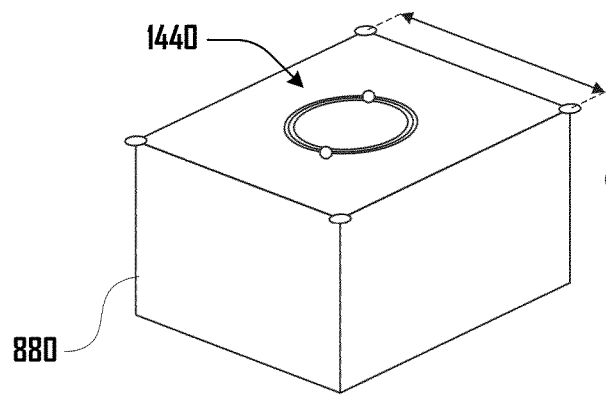

FIG. 14c depicts a rendered work-piece 880 where a positive cylindrical body 1430 with a central negative cylindrical cavity is generated by further indicating a second circle on a two dimensional plane of the work-piece 880 and extending the circle in a third dimension perpendicular to the two dimensional plane. By taking the inverse of the body of FIG. 14c, a negative cylindrical body 1430 with a central positive cylindrical body is generated as depicted in FIG. 14d. In various embodiments, parametric two-dimensional drawing functions may be used to render and manipulate a work-piece.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A computer implemented method of rendering a machine state, the method comprising:
   receiving a first physical machine identifier at a user device from a first physical machine, the user device being separate from and different than the physical machine;
   determining a machine profile associated with the received physical machine identifier, the determined machine profile selected from a plurality of machine profiles respectively associated with a different physical machine having a different physical configuration from the other physical machines and including rendering data for rendering the physical configuration of the respective physical machine;
   presenting a first rendering of the physical configuration of the first physical machine based on the determined machine profile including rendering data for rendering the physical configuration of the first physical machine;
   receiving editing data based on direct three dimensional editing of the rendered work-piece via an interface at the user device to indicate a desired final cutting state of a physical work-piece before cutting of the physical work-piece;

generating a work-piece cut path based on an edited work-piece rendering before cutting of the physical work-piece;

rendering the generated work-piece cut path on the rendered work-piece before cutting of the physical work-piece, the generated work-piece cut path imposed on the rendered work-piece via the interface and including a preview of cutting the work-piece via the work-piece cut path; and initiating cutting the physical work-piece via the generated work-piece cut path.

2. The method of claim 1, wherein the first physical machine comprises a CNC machine.

3. The method of claim 1, further comprising:
receiving work-piece data; and
presenting a second updated rendering of the first physical machine further comprising a rendering of a physical work-piece associated with the first physical machine based at least in part on the received work-piece data.

4. The method of claim 3, wherein the physical work-piece corresponding to the rendered work-piece and the direct three dimensional editing of the rendered work-piece via the interface being limited based on the determined machine profile.

5. The method of claim 1, further comprising:
receiving physical machine state data at the user device from the first physical machine corresponding to a physical configuration of the first physical machine; and
presenting a second updated rendering of the first physical machine further based at least in part on the machine state data, the rendering further corresponding to the physical configuration of the first physical machine and including an endmill without rendering a chuck that holds the endmill.

6. The method of claim 1, further comprising:
receiving real-time physical machine state data at the user device from the first physical machine corresponding to a real-time physical configuration of the first physical machine; and
presenting a second real-time updated rendering of the first physical machine further based on the real-time physical machine state data, the rendering further corresponding to the real-time physical configuration of the first physical machine and including an endmill without rendering a chuck that holds the endmill.

7. The method of claim 1, wherein the first rendering of the first physical machine comprises:
a housing rendering that includes four sidewalls including a front-wall, two peripheral walls and a rear wall that collectively define a cavity with the sidewalls defining a plurality of windows;
an X-carriage rendering that translates within the cavity on a pair of X-rods that extend between the peripheral walls;
a Z-carriage rendering that translates on a pair of Z-rods disposed within the X-carriage; and
a Y-bed rendering that translates along Y-rods that extend between the front and rear walls.

8. The method of claim 1, wherein the plurality of machine profiles, including the determined machine profile, each comprise:
physical dimensions of a physical machine housing of a physical machine;
physical dimensions of a Y-bed of a physical machine; and
a machine model identifier of a physical machine.

9. A computer implemented method comprising:
determining a machine profile associated with a received physical machine identifier of a first physical machine, the determined machine profile selected from a plurality of machine profiles respectively associated with a different physical machine having a different physical configuration from the other physical machines;
presenting a first rendering of the physical configuration of the first physical machine based on the determined machine profile including rendering data for rendering the physical configuration of the first physical machine;
receiving editing data based on direct dimensional editing of the rendered work-piece via an interface to indicate a desired final cutting state of a physical work-piece before cutting of the physical work-piece;
generating, before cutting of the physical work-piece, a work-piece cut path based on the received editing data based on the direct dimensional editing of the rendered work-piece via the interface to indicate the desired final cutting state of the physical work-piece;
rendering the generated work-piece cut path associated with the rendered work-piece before cutting of the physical work-piece, the generated work-piece cut path imposed on the rendered work-piece via the interface and including a preview of cutting the work-piece via the work-piece cut path; and
initiating cutting the physical work-piece via the generated work-piece cut path.

10. The method of claim 9, wherein the machine profile comprises rendering data for rendering the physical configuration of the respective physical machine; and
wherein presenting the first rendering of the physical configuration of the first physical machine is further based on the rendering data for rendering the physical configuration of the first machine.

11. The method of rendering a machine state of claim 9, wherein the first machine comprises a CNC machine including one of a milling machine, laser cutter or cutting machine.

12. The method of claim 9, further comprising:
receiving work-piece data; and
presenting a second updated rendering of the first physical machine further comprising a rendering of a work-piece associated with the first physical machine based at least in part on the received work-piece data.

13. The method of claim 12, wherein the direct dimensional editing of the rendered work-piece via the interface limited based on the determined machine profile.

14. The method of claim 13, further comprising:
rendering the physical work-piece in a first un-cut state associated with the work-piece data;
receiving real-time machine state data from the machine corresponding to a real-time physical configuration of the machine during cutting the physical work-piece via the generated work-piece cut path; and
presenting a real-time updated rendering of the physical work-piece in a second cutting state based on the real-time machine state data, the rendering depicting real-time cutting of the physical work-piece.

15. The method of claim 9, further comprising:
receiving machine state data from the first machine corresponding to a physical configuration of the first physical machine; and
presenting a second updated rendering of the first physical machine further based at least in part on the machine state data, the rendering further corresponding to the physical configuration of the first physical machine.

16. The method of claim 9, further comprising:
receiving real-time machine state data from the first physical machine corresponding to a real-time physical configuration of the first machine; and
presenting a second real-time updated rendering of the first machine further based on the real-time machine state data, the rendering further corresponding to the real-time physical configuration of the first physical machine.

17. The method of claim 9, wherein the first rendering comprises:
a housing rendering that includes four sidewalls including a front-wall, two peripheral walls and a rear wall that collectively define a cavity;
an X-carriage rendering that translates within the cavity on a pair of X-rods that extend between the peripheral walls;
a Z-carriage rendering that translates on a pair of Z-rods disposed within the X-carriage; and
a Y-bed rendering that translates along Y-rods that extend between the front and rear walls.

18. The method of rendering a machine state of claim 9, wherein the plurality of machine profiles, including the determined machine profile, each comprise:
dimensions of a physical machine housing of a physical machine;
dimensions of a Y-bed of a physical machine; and
a machine model identifier of a physical machine.

* * * * *